INVENTOR.
ROBERT W. GOODE

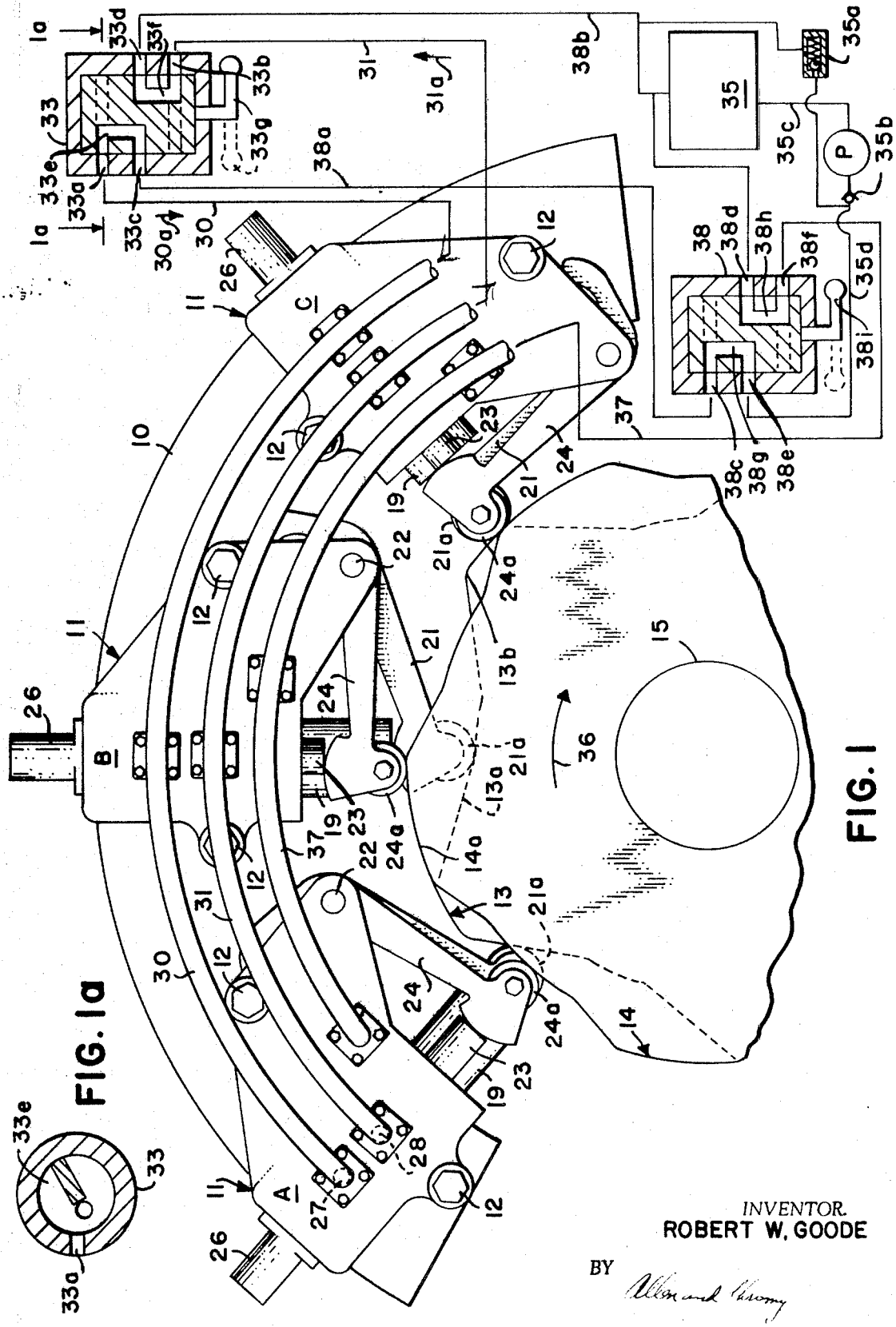

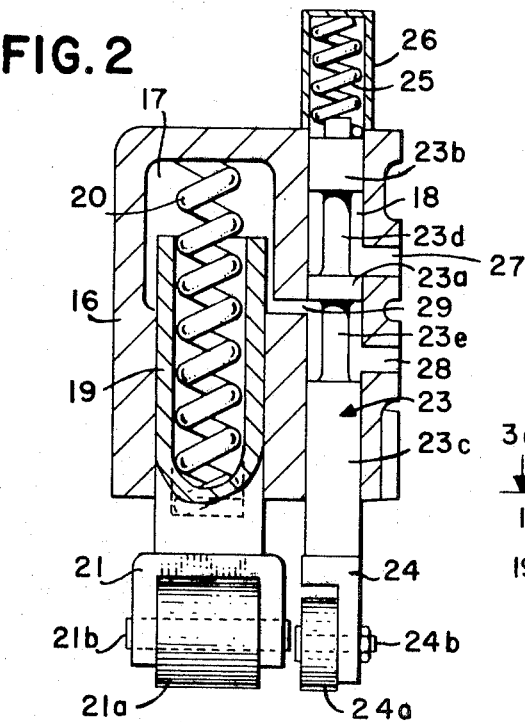
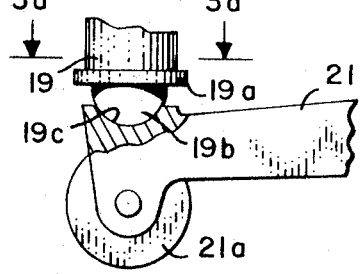
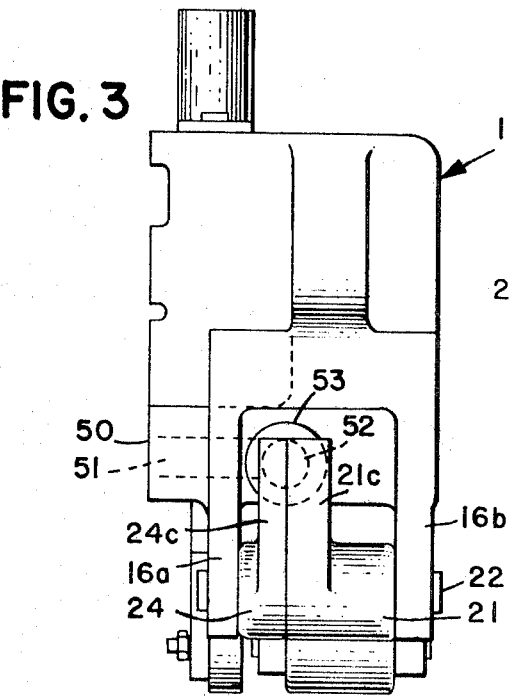
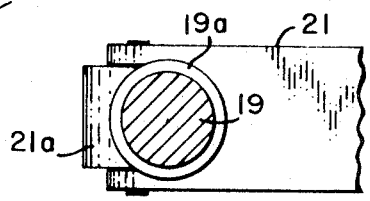

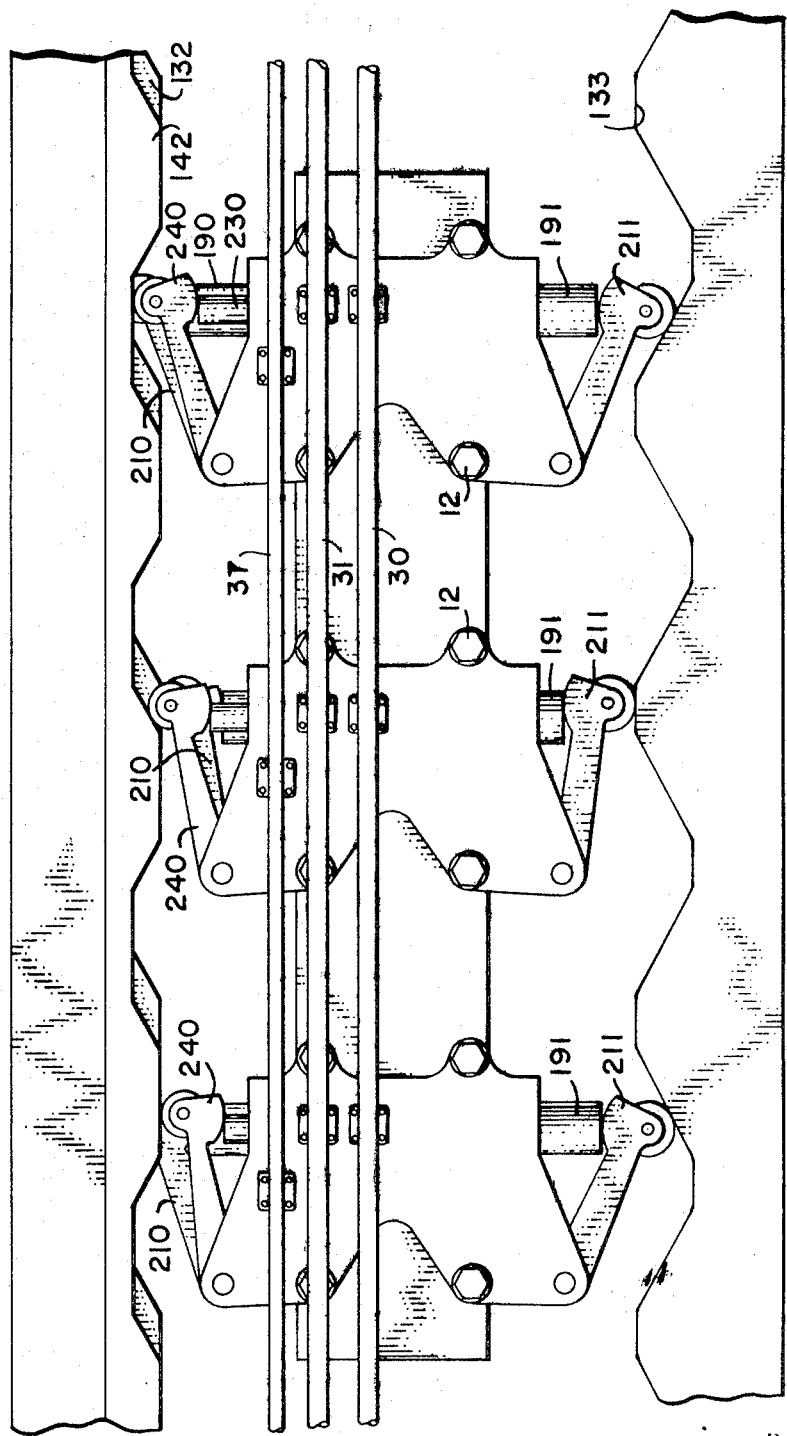

BY

ATTORNEYS

United States Patent Office 3,621,760
Patented Nov. 23, 1971

3,621,760
UNIVERSAL POWER UNIT
Robert W. Goode, 2708 Peach Tree Lane,
Arlington, Tex. 76010
Filed June 2, 1969, Ser. No. 829,490
Int. Cl. F01b 1/06, 13/06
U.S. Cl. 91—481                         8 Claims

ABSTRACT OF THE DISCLOSURE

A hydraulic device adapted either for rotary or linear motion, this device employs one or more universal power units, each unit consisting essentially of a power piston or pistons and a valve or valves provided with means adapted to engage a cam track or tracks such that the power unit is adapted to function either as a motor or load such as a pump. This device is also constructed so that the track engaging means may be disengaged therefrom for free wheeling operation.

DESCRIPTION OF THE INVENTION

This invention relates to hydraulic apparatus employing one or more universal power units and being adapted to function either as a motor or a pump.

An object of this invention is to provide an improved hydraulic device employing one or more universal power units, said units being adapted to function either as a motor or as a pump.

Another object of this invention is to provide an improved hydraulic device employing one or more universal power units each consisting essentially of a power piston or pistons and a valve or valves which are provided with means adapted to engage a cam track or tracks to provide driving motion between the units and the tracks when the device functions as a motor or to provide a load on the tracks when the device functions as a pump.

Another object of this invention is to provide an improved hydraulic or pneumatic device which will move in both forward and reverse directions and which will create or respond to either rotary or linear motion.

Another object of this invention is to provide an improved hydraulic or pneumatic pump employing several universal power units which are adapted to be actuated by a cam track.

Still another object of this invention is to provide a hydraulic or pneumatic device with several universal power units which may be readily replaced and serviced without complete disassembly of the device.

Still another object of this invention is to provide a hydraulic or pneumatic device employing several power units which are arranged in groups which may be isolated from each other so that any selected number of groups may be made operative depending upon the demand placed on the device.

Still another object of this invention is to provide an improved hydraulic or pneumatic device with several universal power units which are adapted to cooperate with a cam track that is adapted to be driven by the power units and which may overhaul the power units and cause them to function as pumps under certain conditions.

Other and further objects of this invention will be apparent to those skilled in the art to which it relates from the following specification, claims and drawing.

In accordance with this invention there is provided a hydraulic or pneumatic device designed to replace high speed hydraulic motors or pumps and their gear, chain or other drives used to bring the speed thereof to practical limits. This invention employs several universal power units each of which consist essentially of a power piston or pistons and a valve or valves which are adapted to be operatively associated with cam tracks which are adapted to be driven or which are adapted to drive the units. When this device is to be used as a motor suitable hydraulic or pneumatic pressure is supplied through the valves to the pistons so that the pistons drive the cam track or tracks associated therewith. Either the same track or tracks or additional track or tracks are employed for actuating and controlling the valves as said tracks are moved by the operation of the pistons.

On the other hand, when the units function as a load on the tracks, the tracks drive the units which then function as pumps to control the motion of the tracks.

Various arrangements of the power units and cam tracks may be employed so that a substantial variety of hydraulic or pneumatic devices having various capabilities and flexibility of operation may be obtained and several different arrangements thereof will be described in the following specification and claims and illustrated in the drawings in which, briefly:

FIG. 1 is a side view partially broken away of a hydraulic or pneumatic device employing three universal power units which are arranged around cam tracks supported by a rotatable shaft;

FIG. 1a is a sectional view of one of the valves shown in FIG. 1 and is taken along the line 1—1 thereof;

FIG. 2 is a view partially in section of one of the universal power units;

FIG. 2a is a side view partly in section showing a bearing member adapted to be used with the power piston of this device;

FIG. 3 is an end view of one of the universal power units;

FIG. 3a is a sectional view taken along the line 3a–3a of FIG. 2a;

FIG. 7 is a view of a device employing several universal power units in which the pistons are arranged back to back;

Figure 4:
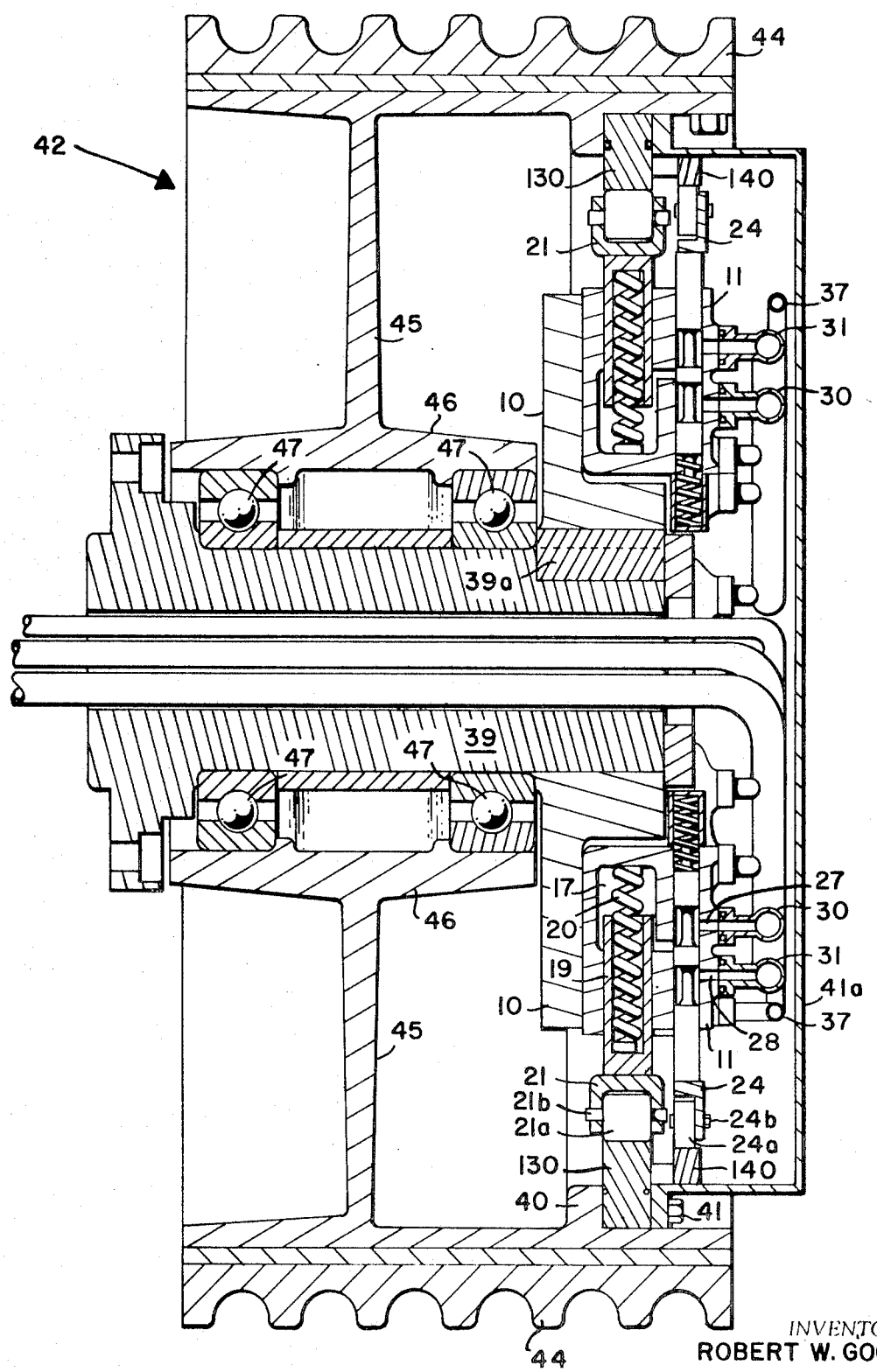
FIG. 4 is a vertical sectional view of a bull wheel employing this invention.

Referring to the drawing in detail FIG. 1 shows a fragmentary view of an embodiment of this invention in which a group including three of the power units 11 are fixedly attached to the frame member 10 by bolts 12. The power units 11 are supported around the cams 13 and 14 which are fixedly attached to the rotatable shaft 15. The power units 11 may be used in groups of three as shown in FIG. 1, although different numbers thereof may be used in a group as will be described hereinafter. If more than three units are used in a group then the cams 13 and 14 have to be shaped to provide the desired sequence of operation of the units as will be apparent from a description of the operation of this apparatus. Also, while only one group of three power units 11 is shown in FIG. 1 several such groups each of which is controlled by a separate valve, may be arranged around the cams 13 and 14 so to increase the power with which the shaft 15 is driven. Furthermore the cams may be placed around the power units 11 as shown in the embodiment of this invention illustrated in FIGS. 4 and 5. Such an arrangement may be more adaptable for use in driving or controlling a large wheel such as a bull wheel, however in both embodiments of this invention shown in FIGS. 1 and 4 the power units 11 are the same, and therefore the same reference numerals will be applied to corresponding parts in both of these embodiments.

The details of construction of the power units 11 are shown in FIGS. 2 and 3, each unit is provided with a housing 16 having cylindrical cavities 17 and 18. The lower part of the cylindrical cavity 17 is slightly smaller than the upper part and is provided with a power piston 19 slidably positioned therein. The piston 19 is provided with a cavity which is adapted to receive the spring 20 so that one end of the spring is inside of the piston while the other end is in engagement with the inside upper wall of the cavity. Thus the spring 20 urges the piston 19 out of the cylindrical cavity 17 and into engagement with the cam follower lever 21, as shown in FIG. 2, which is pivotally supported on the housing 16 by the pivot pin 22. Suitable bearing members 19a of wear resisting material may be provided to each of the power pistons as shown in FIGS. 2a and 3a to receive the pressure at this point over a larger area. The bearing member 19a is provided with a flat top having an area larger than the bottom of the piston 19 and it is also provided with a hemispherical bottom part 19b that is adapted to fit into the socket 19c provided in the cam follower 21.

The cylindrical cavity 18 is provided with a valve piston 23, the lower end of which engages the cam follower lever 24, as shown in FIG. 2, which is also supported on the housing 16 by the pivot pin 22. The cam follower levers 21 and 24 are pivotally supported by the pivot pin 22 on the housing members 16a and 16b as shown in FIG. 3 and these members are in the form of brackets integral with the housing.

A spring 25 is positioned in a small auxiliary housing 26 attached to the upper part of housing 16, and this spring exerts pressure on the upper part of the piston 23 urging it downward so that the lower part of this piston engages the cam follower lever 24. The piston 23 is provided with spaced enlarged portions 23a, 23b and 23c. Enlarged portion 23a is between portions 23b and 23c and is connected thereto by portions of reduced diameter 23d and 23e, respectively. Enlarged portions 23a, 23b and 23c are in contact with the inside cylindrical walls of the cavity 18 and enlarged portion 23a is adapted to slide past the passage 29 which connects cavity 17 to cavity 18 so that this enlarged portion may be positioned either above the passage 29 or below it. Thus, the passage 29 may be connected either to the port 27 or to the port 28 depending upon whether the enlarged portion 23a is below the passage 29 or above this passage. The ports 27 of the three units 11 shown in FIG. 1 are all connected to the pipe 30 and the ports 28 of these devices are all connected to the pipe 31 so that these units function as a group.

Cam follower levers 21 and 24 are provided with rollers 21a and 24a, respectively, which are attached thereto by suitable bearing members 21b and 24b, respectively. Rollers 21a and 24a are adapted to engage the cams 13 and 14, respectively, thus the roller 21a transmits power to the cam 13 for rotation of the shaft 15 while cam 14 controls the position of the valve piston 23.

The pipe 30 is adapted to be connected to the port 33a of the four-way valve 33 and the pipe 31 is adapted to be connected to the port 33b of this valve. The high pressure line 38a is connected between the port 33c of valve 33 and the port 38c of four-way valve 38. The low pressure line 38b is provided between the port 33d of valve 33 and the port 38d of valve 38. This line is also connected to the fluid storage tank 35 and the low pressure side of the relief valve 35a. One side of the pump P is connected by the line 35c to the tank 35 and the other side is connected to the check valve 35b provided in the high pressure line 35d which is connected to the port 38e of valve 38. The pipe 37 which is connected to the ports 50 of the power units 11 is connected by line 37 to the port 38f of valve 38.

In explaining the operation of the apparatus shown in FIG. 1 the three power units 11 will be referred to as units A, B and C as indicated in this figure. Pressure is supplied to the ports 27 of these units through the pipe 30 which is connected by the four-way valve 33 to the pressure line 38a and it is assumed that the valve in unit A is in position to admit fluid under pressure to the power piston in this unit which applies pressure to the cam follower 21–21a on cam track 13. This downward pressure causes the track 13 to move away from the pressure and rotate in the direction indicated by the arrow 36. As this action takes place unit B is positioned with its valve moving to vent its power cylinder to the port 28 and pipe 31. Motion in the direction indicated by arrow 36 allows the power piston in unit B to move inward since the cam follower lever associated therewith is moving along the portion 13a of the cam track, thereby displacing the fluid from its cylinder through the pipe 31. Unit C is then in position to make a power stroke as the cam tracks 13 and 14 move in the direction indicated by the arrow 36 under the pressure of unit A. Valve of unit C moves down and fluid under pressure is allowed to enter the cylinder thereof through pipe 30 and the passages connected thereto. As unit A nears the end of its power stroke unit C is starting its power stroke at the top of the inclined portion 13b of the cam track. At this time unit B is finishing its exhaust stroke since the cam follower associated with its valve piston is approaching the end of the portion 14a of the cam track then as the cam follower of unit C associated with its power piston is nearing the end of the power stroke on cam track 13b unit B starts its power stroke. This action is repeated as the cam tracks are moved and the shaft 15 is rotated, thus supplying fluid under pressure to the power pistons of the units A, B and C in the sequence described above produces rotation of the cam tracks and the shaft 15.

When the valve 33 is in the position shown in FIG. 1 the power units 11 are supplied with high pressure fluid through pipe line 30 which is connected to the valve port 33a so that high pressure fluid flows through this line in the direction indicated by the arrow 30a. High pressure fluid flows from line 38a to the port 33c and valve passage 33e to the port 33a and into line 30. High pressure fluid is supplied to line 38a through passage 38g of valve 38 and high pressure line 35d which is connected to the port 38e of valve 38 and the pump P through the check valve 35b. When it is desired to reverse the rotation of the shaft 15 so that such rotation is counter-clockwise instead of clockwise as indicated by the arrow 36, the handle 33g of valve 33 is moved from the position shown in solid lines to the position shown in broken lines. The passage 33e of this valve will then be connected between the port 33a and the port 33d so that the line 30 then becomes a low pressure line since it is connected to the line 38b and line 31 becomes a high pressure line since the passage 33f in the plug of the valve is connected between the port 33c and the port 33b. Thus the line 31 then becomes the high pressure line and the line 30 becomes a low pressure line so that the operation of the power units 11 is reversed. It will be noted that the passages 33e and 33f extend almost all the way around the plug of the valve as shown in the sectional view, FIG. 1a. Thus the plug of this valve may be rotated almost through a complete revolution and the passage 33 is connected throughout this rotation to the port 33a and the passage 33f is connected almost throughout the rotation to the port 33b. Valve 38 is similar to valve 33 in that passages 38g and 38h are open to ports 38e and 38f almost over the complete revolution of the valve.

In case the load on the shaft 15 should overhaul the power units 11 these units then function as pumps and the direction of flow of the high pressure fluid in line 30 is reversed from the direction indicated by the arrow 30a. The high pressure fluid then flows through the relief valve 35a around the pump P and tank 35.

Figure 5:
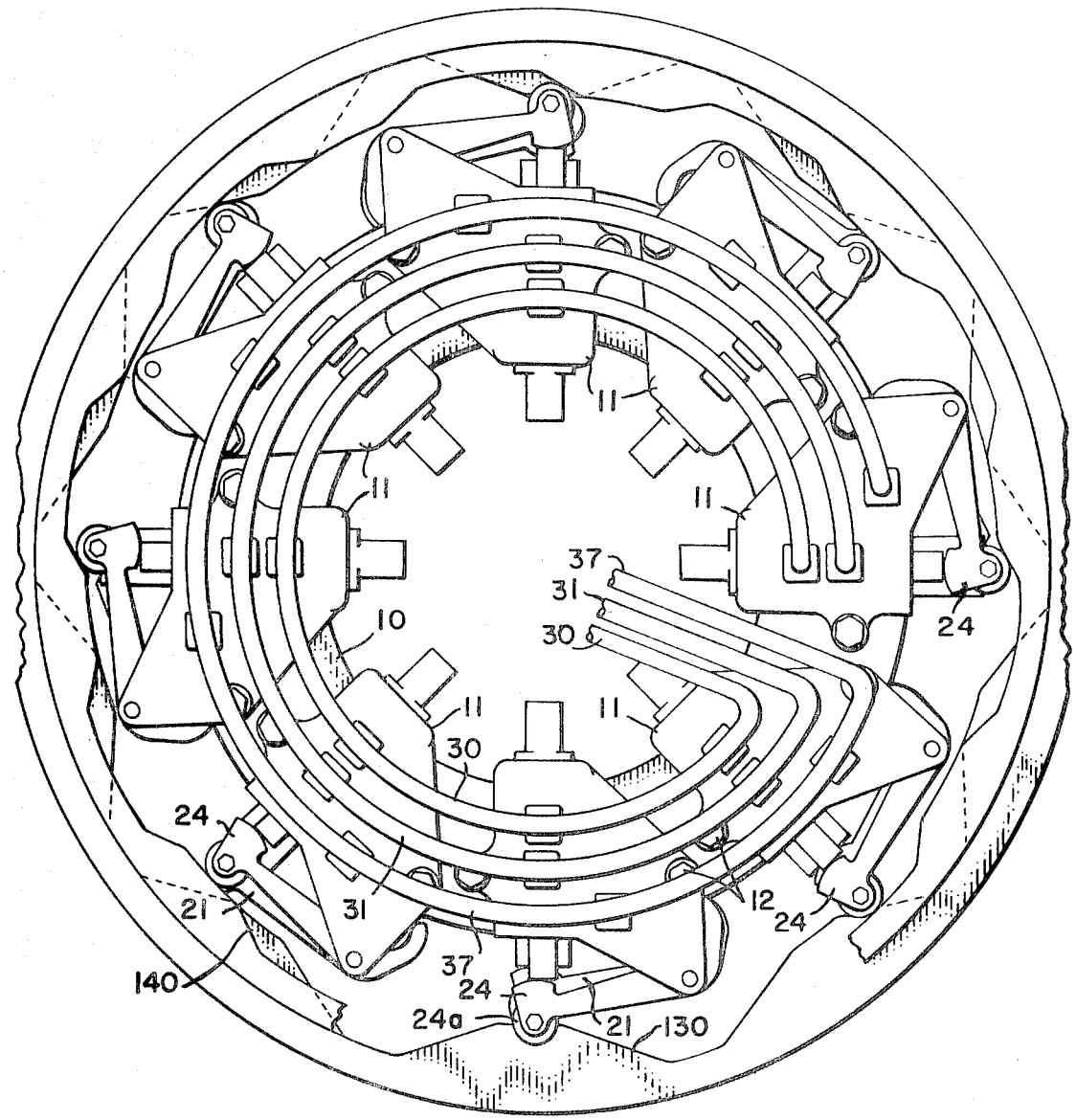
FIG. 5 is a side view of the device shown in FIG. 4 with the cover broken away so as to expose the universal power units employed therein.

In FIGS. 4 and 5 there is shown a view of an embodiment of this invention which is adapted to employ eight power units 11. These power units are all connected to pipes 30 and 31 so that they all function as a group. They may be divided into two groups which are adapted to be used both at once or only one at a time. In such case the units of each group are connected to separate sets of pipes 30, 31 and 37. The power units 11 are attached by bolts 12 to the ring-shaped member 10 which is fixedly attached to the hollow shaft 39 and held in position thereon by the key 39a. The pipes 30, 31 and 37 which are connected to the power units 11 are curved toward the center of the apparatus and passed through the hollow shaft 39.

This apparatus is provided with a power cam track 130 and a valve cam track 140 which are positioned around the outside of the power units 11 and are supported on the internal shoulder 40 of the bull wheel 44 by the bolts 41. Several of these bolts are employed and they also serve to hold the housing 41 clamped against the outside surface of the power cam track 130. The bull wheel is also provided with a grooved outer thread member for receiving the cable to be controlled thereby. The rim 42 of the bull wheel is integral with the web 45 which supports the rim on the hub 46 suitable friction reducing bearings 47 support the hub of the wheel on the stationary shaft 39.

Figure 10:
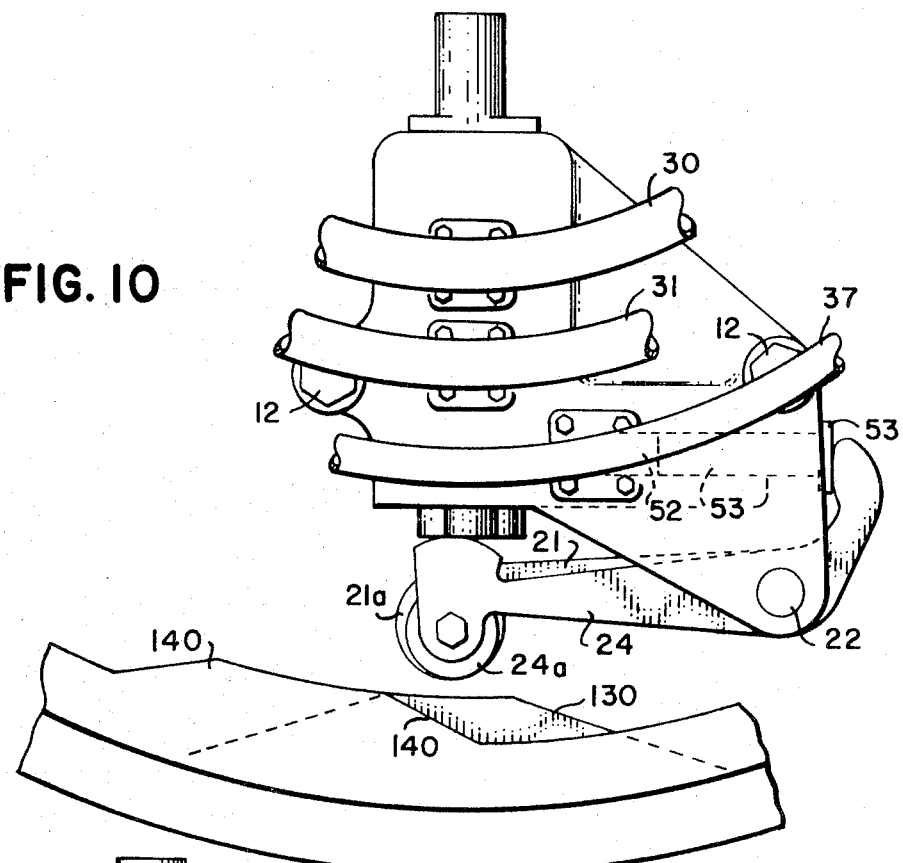
FIG. 10 is a side view of a universal power unit and the portion of the tracks in which the track followers of the power unit have been raised to provide for free wheeling of the device.

The cam followers of units 11 may be lifted off of the cam tracks 13 and 14 when it is desired to allow free wheeling of the shaft 15 or bull wheel 44. When the valve 38 is shifted by moving the handle 38i from the position shown in solid lines to the position shown in broken lines the passage 38h of this valve is connected between the port 38e and the port 38f so that the line 37 becomes a high pressure line and high pressure fluid is supplied to the ports 50 and passages 51 of the power units 11. Pistons 53 in the cylinder cavities 52 of the power units are then forced outward to press against the extensions 21c and 24c of the cam follower levers 21 and 24, respectively, thereby causing the levers 21 and 24 to be lifted away from the cam tracks 13 and 14 so that the rollers 21a and 24a provided to these levers are free and clear of these cams as shown in FIG. 10. The shaft 15 and cam tracks shown in FIG. 1 or the bull wheel shown in FIGS. 4 and 5 are then free to rotate without pressure or restraint by the power units.

Figure 6:
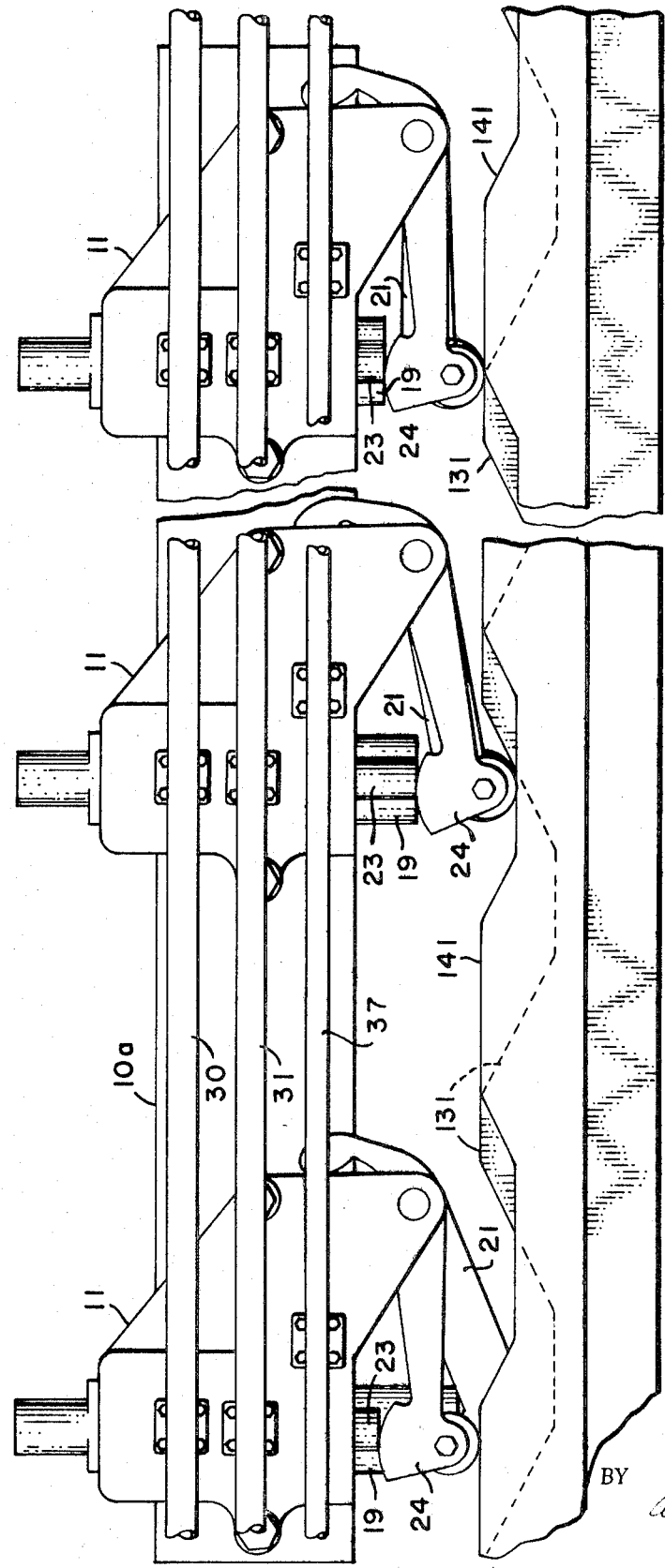
FIG. 6 is a view partially broken away of this invention employing several universal power units arranged to provide linear motion to the cam tracks or to respond to motion of the cam tracks.
Figure 8:
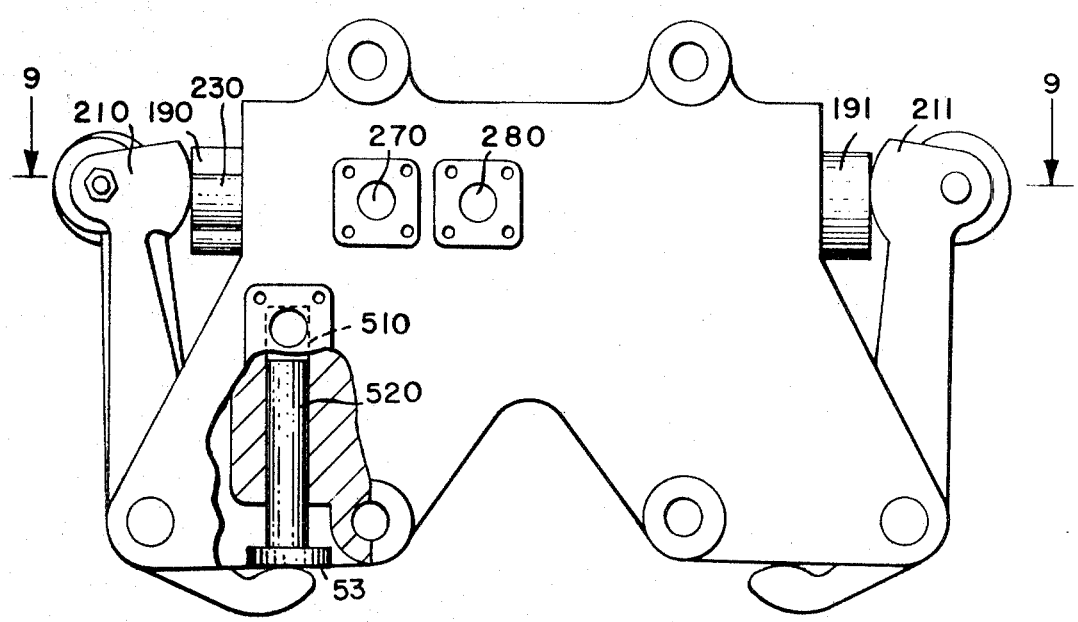
FIG. 8 is a side view of one of the universal power units employed in the apparatus shown in FIG. 7.

In FIGS. 6, 7 and 8 there are shown embodiments of this invention in which the power units 11 are supported on a straight member 10a to cooperate with cam tracks 131 and 141 and impart linear motion to these cam tracks. These power units 11 are also arranged in groups, each group having at least three power units and they are provided with high pressure fluid the same as the units previously described in connection with FIGS. 1 and 4. The arrangement shown in FIG. 6 differs from that shown in FIGS. 1 and 4 only in that the power units 11 are supported on a straight member 10a and the cams 131 and 141 are provided to straight members.

Figure 9:
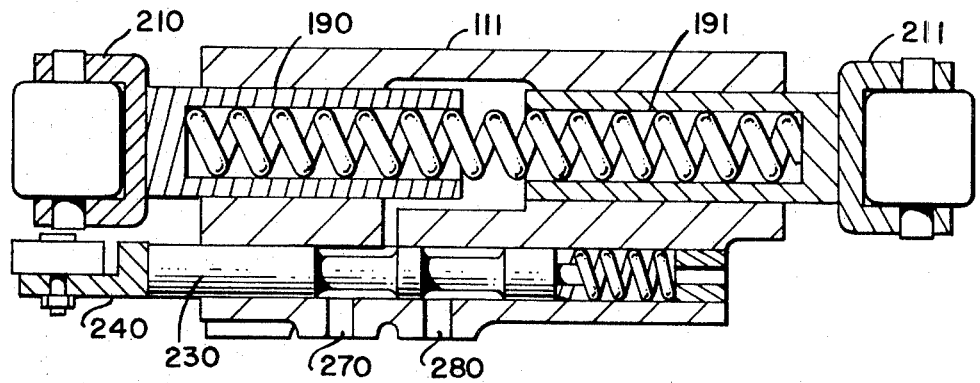
FIG. 9 is a sectional view taken along the line 9—9 of FIG. 8.

The embodiment of this invention shown in FIG. 7 employs power units such as illustrated in FIGS. 8 and 9 which are designated by the reference numeral 111 and each of which is provided with two power pistons 190 and 191 which actuate cam follower levers 210 and 211, respectively. Only one valve 230 is required to control the fluid to the cylinder cavity of both pistons 190 and 191 and this valve is adapted to engage the cam follower lever 240 which is controlled by the cam track 142. Cam follower levers 210 and 211 are adapted to cooperate with the cam tracks 132 and 133, respectively.

Figure 11:
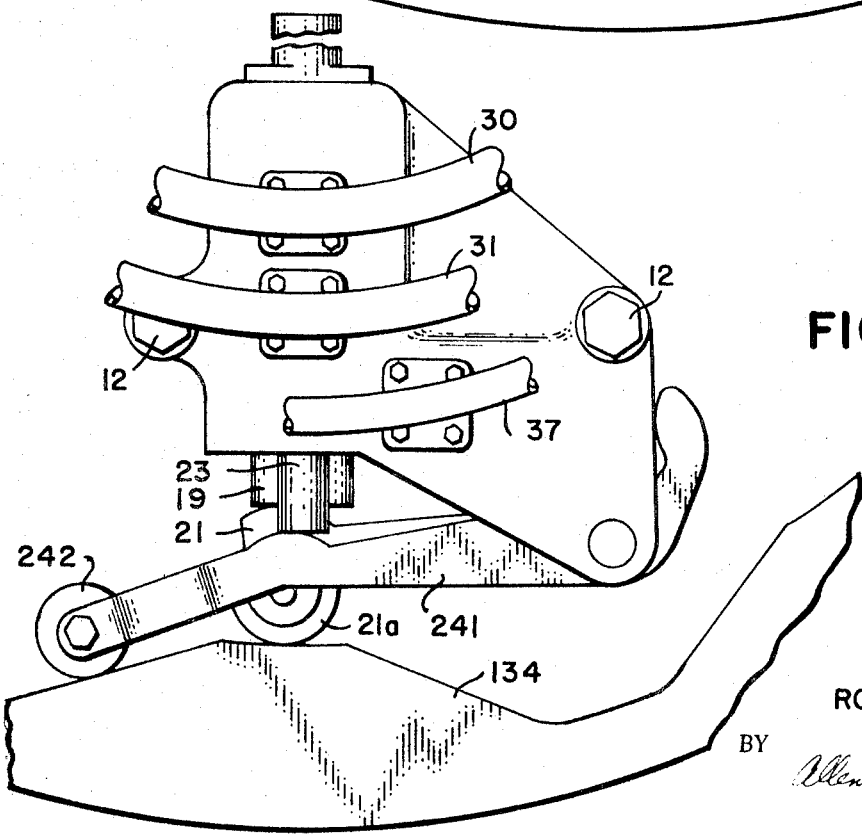
FIG. 11 is a side view of a universal power unit and a portion of a track employed therewith, said power unit being constructed so that both the piston and valve actuator thereof are adapted to work with a single cam track.

In FIG. 11 there is shown an embodiment of this invention in which both the valve and the power piston of the power unit cooperate with one cam track 134. This may be accomplished by making the following lever 241 which actuates the valve 23 longer and curved so that the roller 242 provided thereto engages the cam track 134 slightly ahead or behind the roller 21a of follower lever 21. The length of stroke of the valve 23 is in this case determined by the length of the lever 241 and the point at which the valve engages the lever.

It will be noted that the power cam tracks 13, 130 and 131 all provide areas of dwell for the power pistons when these pistons are at the limits of their motions. Thus these pistons are at rest while the valves associated therewith are changing direction of fluid flow thereto. Also while the pitch of the power cams is shown as being uniform for obtaining uniform motion, this pitch may be more or less steep depending on the speed of the motion desired. Furthermore, by providing cams of different pitches then non-uniform motion can be obtained. Also it may be desirable to provide reversing valves such as the valve 33 shown in FIG. 1, to the devices shown in FIGS. 6 and 7 to reverse the motion in these devices at the ends of their strokes. This may be accomplished by causing the frame or the tracks, whichever is movable, to operate the valve lever 33g at the ends of the stroke to reverse the stroke.

While I have shown and described preferred embodiments of this invention, it will be understood that the invention is capable of variation and modification from the forms shown so that the scope thereof should be limited only by the proper scope of the claims appended hereto.

What I claim is:

1. In hydraulic or pneumatic apparatus which is adapted to operate either as a motor or as a pump, the combination comprising several piston and valve devices, means supporting said devices in predetermined spaced relation, cam track means having a plurality of cams cooperating with said devices, each of said devices having a housing, a cylinder, a piston in said cylinder and a valve controlling fluid passages to said cylinder, said fluid passages having inlet and outlet ports on the housing of each of said devices, tubular means connecting the corresponding ports of said devices together, means supplying fluid under pressure to one of said tubular means, cam track follower means pivotally supported on the housing of each of said devices, said cam track follower means being adapted to be engaged by said piston and said valve in the corresponding one of said devices, said cams of said track means cooperating with said cam track follower means so that when pressure is supplied through said tubular means to the pistons of said devices in a predetermined sequence controlled by the valves of said devices relative motion is produced between said cam track means and said devices.

2. In hydraulic or pneumatic apparatus which is adapted to operate either as a motor or for pumping fluids the combination as set forth in claim 1 further characterized in that said one of said tubular means connects the inlet ports of said devices together and another one of said tubular means connects the outlet ports of said devices and means connecting the high pressure of said fluid pressure supply means to said tubular means selectively to control the direction of said relative motion.

3. In hydraulic or pneumatic apparatus which is adapted to be used either as a motor or for pumping fluids the combination as set forth in claim 1 further characterized in that said cam track means is attached to the inside of a bull wheel, said bull wheel being rotatably supported on a fixed member and said means supporting said devices being attached to said fixed member.

4. In hydraulic or pneumatic apparatus which is adapted to be used either as a motor or for pumping fluids the combination as set forth in claim 1 further characterized in that said devices each comprise a pair of opposed pistons and said cam track means comprises opposed substantially linear members.

5. In hydraulic or pneumatic apparatus as set forth in claim 1 further comprising means lifting said cam track follower means away from said cam track means to provide free wheeling motion between said devices.

6. In hydraulic or pneumatic apparatus as set forth in claim 1 further characterized in that said cam track means comprises one cam track adapted to cooperate with the pistons of said devices and control the valves thereof.

7. In hydraulic or pneumatic apparatus as set forth in claim 1, further comprising bearing means between said cam follower means and the piston of each of said devices, said bearing means having an area of contact engaging said piston substantially larger than the contact area of said piston.

8. In hydraulic or pneumatic apparatus as set forth in claim 1, further characterized in that said cam track means includes power cams having sections of different pitches so that said relative motion is irregular.

References Cited

UNITED STATES PATENTS

| | | | |
|---|---|---|---|
| 1,220,173 | 3/1917 | Borras et al. | 91—203 |
| 1,335,065 | 3/1920 | Lutz | 91—203 |
| 2,984,222 | 5/1961 | Smith | 91—188 |
| 3,424,059 | 1/1969 | Conner et al. | 91—175 |
| 461,082 | 10/1891 | Maddock | 91—188 |
| 3,147,669 | 9/1964 | Lundquist | 91—188 |

FOREIGN PATENTS

| | | | |
|---|---|---|---|
| 126,385 | 5/1919 | Great Britain | 91—188 |
| 1,083,801 | 6/1954 | France | 91—188 |

PAUL E. MASLOUSKY, Primary Examiner

U.S. Cl. X.R.

91—188